G. H. RICE.
AUTOMATIC UNCOUPLING MEANS FOR SHAFT CLUTCHES.
APPLICATION FILED FEB. 16, 1917.
1,242,723.
Patented Oct. 9, 1917.
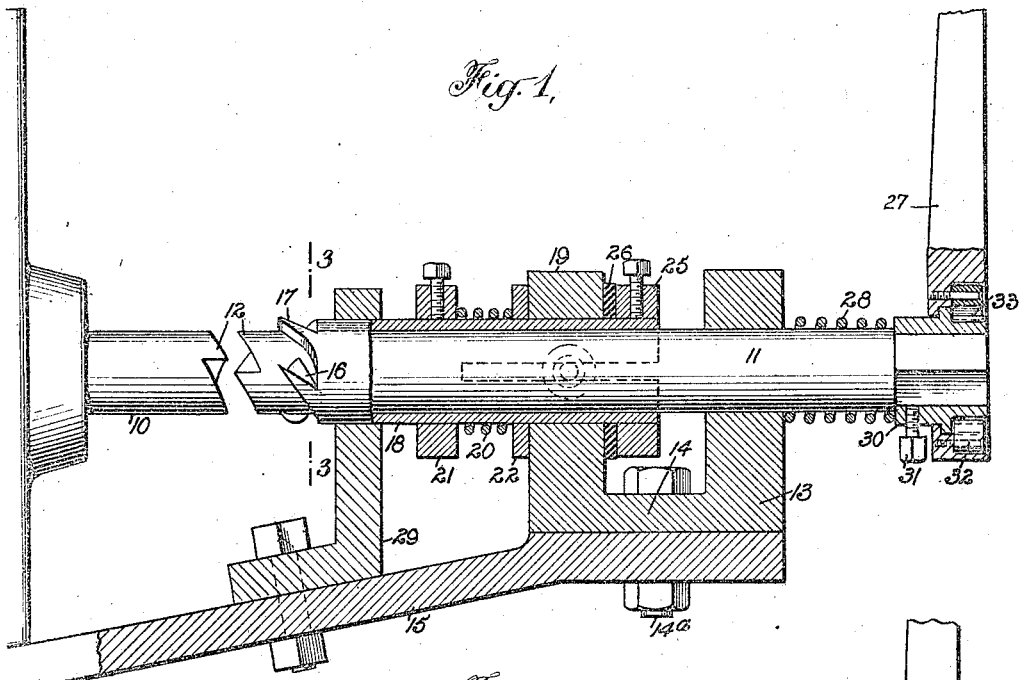
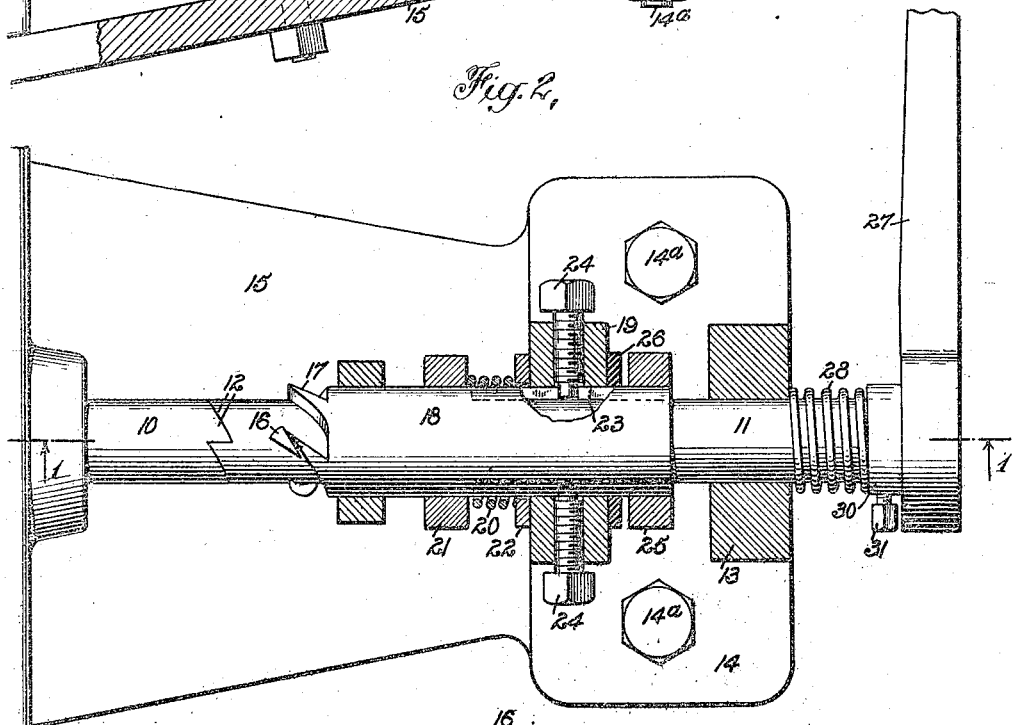
WITNESSES
INVENTOR
George H. Rice
BY
ATTORNEYS

UNITED STATES PATENT OFFICE.

GEORGE HENRY RICE, OF HONOLULU, TERRITORY OF HAWAII.

AUTOMATIC UNCOUPLING MEANS FOR SHAFT-CLUTCHES.

1,242,723. Specification of Letters Patent. Patented Oct. 9, 1917.

Application filed February 16, 1917. Serial No. 148,993.

*To all whom it may concern:*

Be it known that I, GEORGE H. RICE, a citizen of the United States, and a resident of Honolulu, Territory of Hawaii, have invented a new and Improved Automatic Uncoupling Means for Shaft-Clutches, of which the following is a full, clear, and exact description.

My invention is more particularly intended for use in connection with the crank shaft of an automobile or auto truck, and the prime object of the invention is to provide in connection with the crank shaft, stop means operable to arrest reverse turning movement of said shaft, whereby to prevent injury by the crank handle should the engine back-fire.

In carrying out my invention use is made of coacting stop means on the crank shaft and on a sleeve in which the shaft turns, the sleeve being spring-pressed to position its stop means in the path of the stop means on the shaft, the arrangement being such that should the engine back-fire and a reverse turning movement be given to the crank shaft, such turning movement will be arrested by engagement of the stop members, and a sliding movement will be imparted to the crank shaft to unclutch the same.

Reference is to be had to the accompanying drawings forming a part of this specification in which similar reference characters indicate corresponding parts in all the views.

Figure 1 is a sectional side elevation showing a practical embodiment of my invention;

Fig. 2 is a sectional plan view thereof;

Fig. 3 is a cross section on the line 3—3, Fig. 1.

In the illustrated example, the numeral 10 indicates a driven shaft such as the engine shaft of an automobile, and 11, the crank shaft, said shafts having mating clutch members 12. The crank shaft 11 turns in a bearing 13 here shown as formed on a plate 14, secured by bolts 14ᵃ to a bracket 15.

On the crank shaft 11 preferably adjacent to the clutch is a laterally projecting stop projection 16 which preferably tapers rearwardly. Co-acting stop members 17 are produced on the front end of a sleeve 18 in which the crank shaft 11 turns, presenting spirally disposed spaces between said members 17 in which the stop projection 16 may enter. The sleeve 18 is secured in a bearing member 19 which may be integral with the plate 14 as shown.

A compression spring 20 is coiled about the sleeve 18 between a collar 21 on said sleeve, and the adjacent face of the bearing 19, there being preferably interposed between the spring and said bearing a washer 22. The sleeve 18 has longitudinal grooves or slots 23 in which suitable devices enter to prevent turning movement of the sleeve, while permitting longitudinal movement thereof, there being shown as one example for the purpose, screws 24 associated with the bearing member 19. A collar or flange 25 is produced on the forward end of the sleeve 18. At the opposite side of the bearing 19 from the spring 20 there may be employed an interposed resilient washer 26 between said collar and the bearing 19.

The spring 20 tends to normally maintain the spiral stop members 17 in the path of the projection 16 and in the turning movement of the crank shaft the projection 16 successively engages the members 17 forcing the sleeve 18 against the action of the spring 20 and permitting the turning of the crank shaft. Upon reverse movement of the crank shaft due to the back-fire of the engine, the projection 16 will engage a member 17, thereby giving a sliding movement to the crank shaft and unclutching the same from the driven shaft. The reverse turning movement of the crank shaft will be arrested when the stop projection 16 reaches the base of the engaged member 17 so that only a very limited reversal of the crank 27 can occur, thereby preventing injury to the operator. The numeral 28 indicates the usual spring employed in connection with the crank shaft to unclutch the same. A bearing for the clutch end of shaft 11 is indicated at 29. The crank handle 27 includes a separate hub or sleeve 30, which is detachably applied to the shaft 11 by a set screw 31 or the like. The handle may be turned relatively to the sleeve and operates the shaft by a pawl and ratchet engagement, there being pawls 32 on the handle and ratchet teeth 33 on the sleeve 30.

Having thus described my invention I claim as new, and desire to secure by Letters Patent:

The combination with a driven shaft and a drive shaft slidable relatively to the driven shaft, said shafts having mating clutch elements, a lateral stop projection on the drive shaft, a sleeve in which the drive shaft turns, said sleeve having spirally disposed stop members thereon adjacent to the stop projection on the drive shaft, and spring means acting on the sleeve and tending to maintain the same in position for the stop members thereon to engage the stop projection on the shaft.

GEORGE HENRY RICE.